(12) United States Patent
Nylander et al.

(10) Patent No.: US 8,014,776 B2
(45) Date of Patent: Sep. 6, 2011

(54) UNLICENSED-RADIO ACCESS NETWORKS IN A MOBILE COMMUNICATIONS SYSTEM

(75) Inventors: Tomas Nylander, Värmdö (SE); Jari Tapio Vikberg, Jaerna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 869 days.

(21) Appl. No.: 10/589,873

(22) PCT Filed: Feb. 18, 2004

(86) PCT No.: PCT/EP2004/001539
§ 371 (c)(1),
(2), (4) Date: Jun. 13, 2007

(87) PCT Pub. No.: WO2005/079087
PCT Pub. Date: Aug. 25, 2005

(65) Prior Publication Data
US 2008/0242298 A1    Oct. 2, 2008

(51) Int. Cl.
*H04Q 7/20* (2006.01)
(52) U.S. Cl. .................. 455/435.2; 455/426.1
(58) Field of Classification Search .......... None
See application file for complete search history.

(56) References Cited

U.S. PATENT DOCUMENTS

| | | | |
|---|---|---|---|
| 5,485,163 A * | 1/1996 | Singer et al. | 342/457 |
| 5,519,706 A | 5/1996 | Bantz et al. | |
| 5,794,149 A | 8/1998 | Hoo | |
| 6,061,337 A | 5/2000 | Light et al. | |
| 6,144,709 A | 11/2000 | Piirainen et al. | |
| 6,477,382 B1 | 11/2002 | Mansfield et al. | |
| 6,487,410 B1 | 11/2002 | Kontio et al. | 455/437 |
| 7,127,250 B2 | 10/2006 | Gallagher et al. | |
| 2002/0019880 A1 | 2/2002 | Sakakura | |
| 2002/0058504 A1 | 5/2002 | Stanforth | |
| 2002/0077097 A1 | 6/2002 | Mizell et al. | |

(Continued)

FOREIGN PATENT DOCUMENTS

EP    1 207 708    5/2002

(Continued)

OTHER PUBLICATIONS

International Search Report of PCT/EP2004/001539, mailed Oct. 12, 2004.

(Continued)

*Primary Examiner* — Phuoc Doan
(74) *Attorney, Agent, or Firm* — Nixon & Vanderhye P.C.

(57) ABSTRACT

Cellular mobile networks can include unlicensed-radio access networks, which comprise access point controllers connected via a fixed broadband network to access points that communicate with mobile stations via unlicensed radio. The access points are connected to the broadband network from any location by the subscriber. In order to alleviate the configuration required to enable handover each access point controller is assigned to a location area defined in the conventional cellular network. A mobile station entering the mini-cell of an access point sends the access point information concerning the location area for the last cell of conventional network it communicated with. With this information, the access point obtains from a memory the fixed broadband address of the access point controller assigned to this location area. The access point uses this address to establish a connection with the access point controller assigned to handle its current location.

12 Claims, 7 Drawing Sheets

U.S. PATENT DOCUMENTS

| | | | |
|---|---|---|---|
| 2002/0197984 | A1 | 12/2002 | Monin et al. |
| 2003/0176186 | A1 | 9/2003 | Mohammed |
| 2004/0146021 | A1 | 7/2004 | Fors et al. |
| 2004/0208151 | A1 | 10/2004 | Haverinen et al. |
| 2004/0209615 | A1 | 10/2004 | Lamb et al. |
| 2005/0075112 | A1 | 4/2005 | Ball et al. |
| 2006/0019656 | A1* | 1/2006 | Gallagher et al. ......... 455/426.1 |
| 2007/0184824 | A1 | 8/2007 | Nylander |
| 2007/0264996 | A1 | 11/2007 | Vikberg et al. |
| 2007/0281696 | A1 | 12/2007 | Vikberg et al. |
| 2007/0291750 | A1 | 12/2007 | Nylander et al. |
| 2008/0119187 | A1 | 5/2008 | Gallagher et al. |

FOREIGN PATENT DOCUMENTS

| | | |
|---|---|---|
| EP | 1 207 708 A | 5/2002 |
| EP | 1 271 852 A2 | 1/2003 |
| EP | 1 351 530 A1 | 10/2003 |
| EP | 1 441 556 | 7/2004 |
| EP | 1 441 556 A | 7/2004 |
| GB | 2 313 257 | 11/1997 |
| GB | 2 313 257 A | 11/1997 |
| WO | WO 99/01002 A2 | 1/1999 |
| WO | WO 99/48312 A | 9/1999 |
| WO | WO 00/07402 A1 | 2/2000 |
| WO | WO 03/079706 A1 | 9/2003 |
| WO | 03/101128 A | 12/2003 |
| WO | WO 03/101128 | 12/2003 |
| WO | WO 2004/002051 | 12/2003 |
| WO | WO 2004/068768 | 8/2004 |

OTHER PUBLICATIONS

U.S. Appl. No. 10/588,658, filed Jun. 12, 2007; Inventor: Vikberg et al.

U.S. Appl. No. 10/591,953, filed Sep. 8, 2006; Inventor: Nylander et al.

U.S. Appl. No. 10/592,317, filed Jul. 24, 2007; Inventor: Nylander et al.

U.S. Appl. No. 11/547,013, filed Oct. 2, 2006; Inventor: Vikberg et al.

Office Action mailed Feb. 19, 2009 in co-pending U.S. Appl. No. 10/588,658.

Office Action mailed Jul. 31, 2009 in co-pending U.S. Appl. No. 10/588,658.

Office Action mailed Apr. 9, 2008 in co-pending U.S. Appl. No. 10/591,953.

Office Action mailed Sep. 16, 2008 in co-pending U.S. Appl. No. 10/591,953.

Office Action mailed May 27, 2009 in co-pending U.S. Appl. No. 10/591,953.

Office Action mailed Feb. 4, 2010 in co-pending U.S. Appl. No. 10/591,953.

Office Action mailed Aug. 3, 2010 in co-pending U.S. Appl. No. 11/547,013.

Office Action mailed Sep. 23, 2010 in co-pending U.S. Appl. No. 11/592,317.

International Search Report of PCT/EP2004/001539, mailed Dec. 10, 2004.

International Search Report of PCT/EP2004/001115 mailed Nov. 9, 2004.

International Search Report of PCT/EP2004/003367 mailed Nov. 25, 2004.

International Search Report of PCT/EP2004/002357 mailed Nov. 9, 2004.

International Search Report of PCT/EP2004/002414 mailed Nov. 25, 2004.

Mahmood et al., "An Architecture for Integrating CDMA and 802.11 WLAN Networks", Vehicular Technology Conference, 2003, VTC 2003-FALL, 2003 IEEE 58th Orlando FL, Oct. 6-9, 2003, pp. 2073-2077, XP010701282.

Office Action mailed Mar. 21, 2011 in co-pending U.S. Appl. No. 10/592,317.

* cited by examiner

UNLICENSED-RADIO ACCESS NETWORKS IN A MOBILE COMMUNICATIONS SYSTEM

This application is the US national phase of international application PCT/EP2004/001539, filed 18 Feb. 2004, which designated the U.S., the entire content of which is hereby incorporated by reference.

OVERVIEW

The technology described in this application concerns mobile communication combining both public mobile access networks and unlicensed access networks. The technology described in this application has specific relevance to the transfer of connections between public mobile networks and unlicensed-radio access networks.

BACKGROUND

In any mobile communication system, such as a GSM network, active calls conducted between a mobile station and a base station need to be handed over to a different base station as the mobile station moves between different coverage areas, or cells. Depending on how each cell is defined, handover may require the active call to be re-routed simply through a different base station transceiver BTS, through a different base station controller BSC or through a different mobile services switching center MSC. Handover may also be necessary when capacity problems are met in any one cell.

Handover necessitates a certain amount of operation and maintenance activities on installation of a system, such as defining neighbouring cells, as well as the base station controller BSC and mobile services switching center MSC that controls the cell, defining which cell frequencies should be measured and what threshold value to use to initiate handover. In a conventional GSM network the base station controller BSC sends a mobile station MS a list of predetermined frequencies to be measured. Two lists may be sent out, a first list being used for idle mode, such as when the mobile station MS is roaming, and a second used for active mode when a call is ongoing. This second list defines which frequencies the mobile station MS should measure and report back on. These lists contain a set of values that refer to absolute radio frequency channel numbers ARFCN of neighbouring cells. In addition to these frequency channel numbers the base station controller BSC also knows base station identity codes BSIC of all neighbouring cells. The mobile station MS measures the frequencies defined by these channel numbers and reports these measurements to the base station controller. In practice, the mobile station MS will report on only the six best measurement values and only for those cell frequencies with which that the mobile station can synchronise and consequently receive an identity code relating to the base station (BSIC). The measurement report sent back to the base station controller BSC by the mobile station MS includes a reference to the absolute radio frequency channel numbers ARFCN, the base station identity codes (BSIC) and an indication of the received downlink signal strength. In fact the report does not specify the exact absolute radio frequency channel numbers ARFCN but rather refers to the position this number occupied in the measurement list. On the basis of this report, the base station controller BSC decides whether handover is necessary and to which cell. The initiation of handover is performed according to the standard GSM mechanism for each vendor. Specifically, a message is sent by the base station controller to the mobile services switching center MSC connected to the base station controller BSC indicating that handover is required. This message contains a cell identifier, encompassed in a cell global identity CGI, which defines the mobile country code, mobile network code, location area code and cell identifier for the cell to which handover is requested. The cell global identity CGI is fetched by the base station controller from a list using the base station identification code BSIC and absolute radio frequency channel number ARFCN obtained for the cell. With this cell global identity CGI the mobile services switching center MSC is able to determine which other MSC handles the cell defined by the CGI value.

Recently proposals have been made to extend conventional cellular networks by including access networks that utilise a low power unlicensed-radio interface to communicate with mobile stations. The access networks are designed to be used together with the core elements of a standard public mobile network and consist essentially of plug-in low-power unlicensed radio transceivers, or access points, each designed to establish an unlicensed radio link with a mobile station MS and a controller or interface node connecting the unlicensed radio transceivers with the mobile core network. Suitable unlicensed-radio formats include digital enhanced cordless telecommunications (DECT), wireless LAN and Bluetooth. An adapted mobile handset capable of operating over both the standard air interface (e.g. the Um interface) and the unlicensed-radio interface means that the subscriber requires only one phone for all environments. The access network is constructed so that the core elements, such as the mobile switching centers MSC, of the public mobile network views the interface node as a conventional base station controller BSC. Such an access network and the mobile station for use with this access network is described in European patent application No. EP-A-1 207 708. The content of this application is incorporated herein by reference.

The low power and resultant low range of the unlicensed-radio interface means that several such access networks may be provided in relatively close proximity, for example one access network per floor of an office building or in a private home. The connection between the unlicensed-radio tranceivers and the associated controller is provided by a fixed broadband network. Preferably communication over this network uses the internet protocol IP, which greatly facilitates the installation of the access network, permitting a subscriber to plug-in an unlicensed-radio transceiver in his own home and consequently install an unlicensed-radio access point himself. However, the flexibility of such unlicensed-radio access networks also presents difficulties. Since an access point can be freely installed and moved by a subscriber to a separate city, state or even country, yet still connect to its original access network controller, the exact location of the access point cannot be tracked by the core network. This imposes huge demands on the operation and maintenance activities required for handover to and from the unlicensed-radio access network, as neighbouring cells may change frequently. Also billing restraints in some areas may require the re-assignment of a relocated access point to a more appropriate access controller, particularly if revenue from calls originating from a specific access point must be accounted for in a specific region of a country. In view of the small size of the access points to an unlicensed radio access network, it would not be cost effective for operators to configure each access point separately. However, it is also undesirable to leave the task of configuration to the subscriber as such a solution would be error prone and consequently unreliable. In addition suppliers would not wish to configure access points differently depending on where these are ultimately to be installed.

SUMMARY

It is thus an object to propose a system for managing the distribution of access points of an unlicensed-radio access network that greatly simplifies handover to an from a conventional public licensed mobile network, such as GSM, UTMS or CDMA2000 to an unlicensed-radio access network connected to the conventional network.

It is a further object to propose a system for managing the distribution of access points of an unlicensed-radio access network that overcomes the problems of configuration on installation of an access point.

It is a still further object to propose a system for managing the distribution of access points of an unlicensed-radio access network that simplifies billing procedures.

These and other objects are achieved in a mobile telecommunications network, an unlicensed-radio access system, for establishing a connection between a mobile station and a core network portion of a mobile communications network via an unlicensed-radio access network and a method for assigning and connecting access points to an access point controller in an unlicensed-radio access network.

In essence, the configuration demands required to enable handover between a cell of a conventional licensed-radio cellular network and a mini-cell of an unlicensed-radio access network even when the access points are continually relocated are alleviated in accordance with the present invention by assigning the interface nodes or access point controllers to a location area defined in the conventional cellular network. Location areas are conventionally defined by a mobile services switching center MSC and the base station controllers BSC and base station tranceivers BTS connected thereto. A recently relocated or rebooted access point communicates with a mobile station that roams into its mini-cell and receives from this mobile station information concerning the location area for the last cell of conventional network the mobile station was in communication with. With this information, the access point obtains from a memory, preferably organised as a lookup table, the fixed broadband network address of the access point controller assigned to this location area. The access point then uses this address to establish a connection with the access point controller assigned to handle its current location.

The fixed broadband access network is preferably an IP network, the address is thus the IP address of the access point controller.

The memory or lookup table may be located on the fixed broadband access network, for example in a database server. This database server is preferably addressed using at least part of the location area information.

The lookup table may alternatively be accessible at the point of connection of the access point to the broadband access network.

In an advantageous non-limiting, example embodiment the access point is capable of storing at least part of the information in the lookup table. For example, the access point could store the location area information and address relating to an access point controller the access point connected to previously. In this way, unnecessary requests to the lookup table can be avoided when the access point needs to be rebooted, following a power cut, or when an access point is reinstalled in a preferred location after a trip abroad.

In another advantageous example, non-limiting embodiment, all access points are capable of connecting with a default access point controller. When an access point receives location area information, this is then transmitted to the default controller, which can access the lookup table itself and return the required address.

DETAILED DESCRIPTION OF THE DRAWINGS

Figure 1:
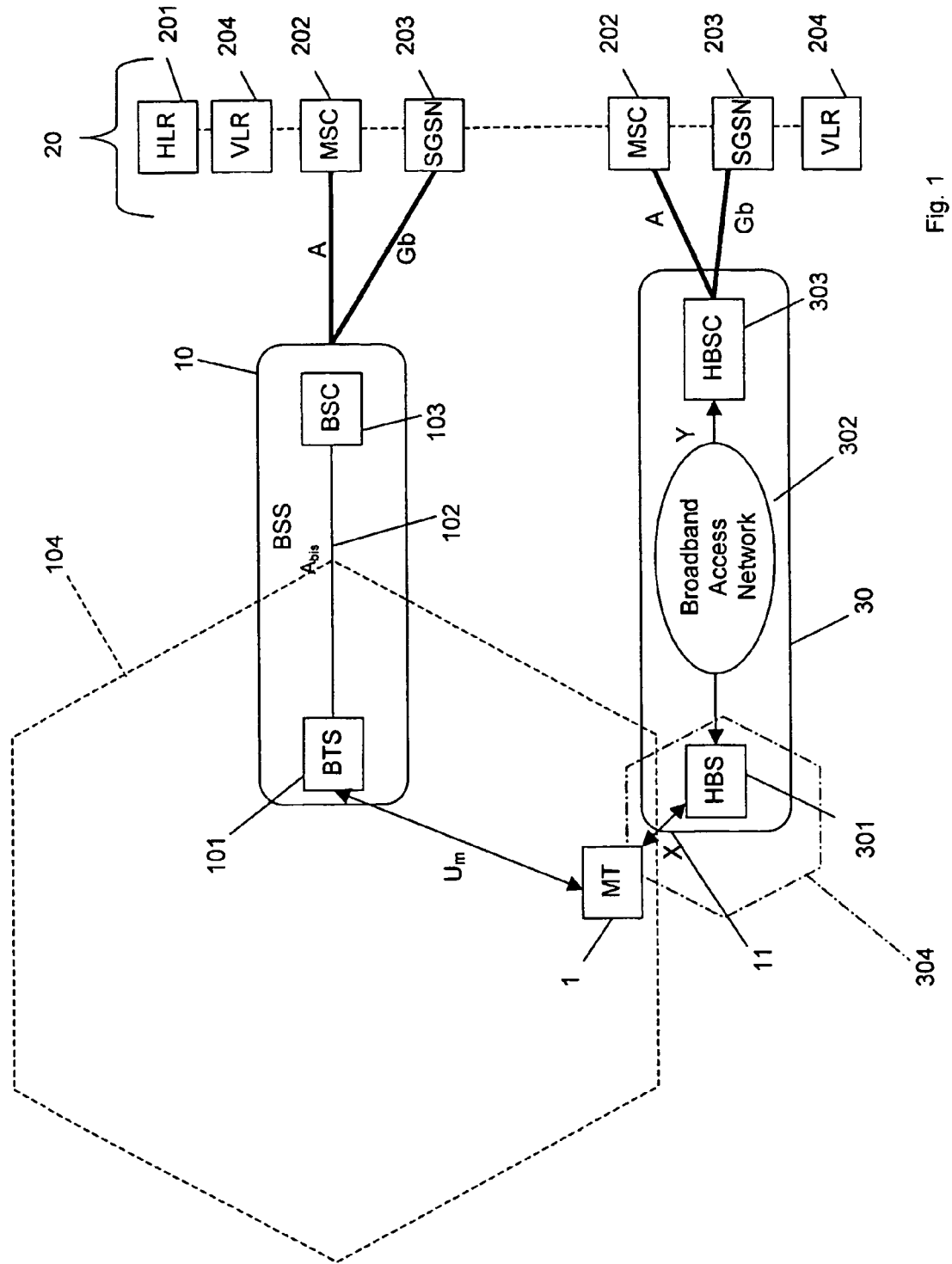
FIG. 1 schematically depicts parts of a GSM network with an unlicensed-radio access network, FIG. 2 schematically depicts the system of location areas in a conventional GSM network, FIG. 3 schematically depicts the system of location areas in a conventional GSM network extended by unlicensed-radio access networks, FIG. 4 schematically depicts the elements required for distributing access points to a correct controller in an unlicensed-radio access network, FIG. 5 exemplifies the signalling sequence between the elements depicted in FIG. 4, and FIG. 6 schematically illustrates the principles of identification of mini-cells in the unlicensed-radio access network of FIG. 1, FIG. 7 schematically depicts the elements required for distributing access points to a correct controller in an unlicensed-radio access network in accordance with a preferred embodiment.

FIG. 1 schematically depicts parts of a conventional GSM network. This network is essentially divided into a core network portion 20 and an access portion 10. The elements of the core network illustrated in the figure include the mobile switching centers or MSCs 202, associated home location register HLR 201 and visitor location register VLR 204. The function and structure of these conventional GSM architecture elements are known to those in the art and will not be described in further detail here. The core network also supports the General Packet Radio Service (GPRS), and to this end serving GPRS support nodes (SGSN) 203 are illustrated. Although not illustrated in the figure, it will be understood by those skilled in the art that the core network portion may include access to other mobile and fixed-line networks, such as ISDN and PSTN networks, packet and circuit switched packet data networks such as intranets, extranets and the Internet through one or more gateway nodes.

The access portion essentially consists of base station subsystems BSS 10, one of which is illustrated in FIG. 1, which communicate via defined fixed standard A and Gb interfaces with MSCs 202 and SGSNs 203, respectively in the core network portion 20. Each base station subsystem BSS 10 includes a base station controller BSC 103 which communicates with one or more base transceiver stations BTS 101 via the defined $A_{bis}$ air interface 102. The base transceiver stations 101 communicate with mobile terminals MT 1 over the GSM standard $U_m$ radio air interface. It will be understood that while the BTS 101 and BSC 103 are depicted as forming a single entity in the BSS 10, the BSC 103 is often separate from the BTSs 101 and may even be located at the mobile services switching centre MSC 202. The physical division depicted in FIG. 1 serves to distinguish between the parts of the network making up the access network portion 10 and those that form the core network portion 20.

In addition to the standard access network portion provided by the BSS's 10 the network depicted in FIG. 1 further includes a modified access network portion 30 shown in the lower half of the figure. Hereinafter this will be described as an unlicensed-radio access network portion 30.

The components making up this unlicensed-radio access network portion 30 also enable the mobile terminal 1 to access the GSM core network portion, and through this, other communication networks via an unlicensed-radio interface X, represented in FIG. 1 by the bi-directional arrow 31. By unlicensed-radio is meant any radio protocol that does not require the operator running the mobile network to have obtained a license from the appropriate regulatory body. In general, such unlicensed-radio technologies must be low power and thus of limited range compared to licensed mobile radio services. This means that the battery lifetime of mobile terminals will be greater. Moreover, because the range is low the unlicensed-radio may be a broadband radio, thus providing improved voice quality. The radio interface may utilise any suitable unlicensed-radio protocol, for example a wireless LAN protocol or Digital Enhanced Cordless Telecommunications (DECT). Preferably, however, Bluetooth radio is utilised, which has a high bandwidth and lower power consumption than conventional public mobile network radio.

The Bluetooth standard specifies a two-way digital radio link for short-range connections between different devices. Devices are equipped with a transceiver that transmits and receives in a frequency band around 2.45 GHz. This band is available globally with some variation of bandwidth depending on the country. In addition to data, up to three voice channels are available. Each device has a unique 48-bit address from the IEEE 802 standard. Built-in encryption and verification is also available.

The element of the fixed access network portion 30 adapted to communicate across the Bluetooth interface is designated a local or home base station (HBS) 301. This element handles the radio link protocols with the mobile terminal MT 1 and contains radio transceivers that define a cell in a similar manner to the operation of a conventional GSM base station transceiver BTS 101. The home base station HBS 301 is controlled by a home base station controller HBSC 303, which communicates with a mobile service switching centre MSC 202 over the GSM standard A interface and also with a serving GPRS support node SGSN 203 over a standard Gb interface, if available in the core network portion. The interface between the home base station HBS 301 and its home base station controller HBSC 303 is designated a Y-interface. The home base station controller HBSC 303 provides the connection between the MSC 202 or SGSN 203 and mobile terminal 1. The joint function of the home base station HBS 301 and the home base station controller HBSC 303 emulates the operation of the BSS 10 towards the SGSN 203 and MSC 202. In other words, when viewed from the elements of the core network 20 such as the mobile service switching centre (MSC) 202 and the serving GPRS support node (SGSN) 203, the fixed access network portion 30 constituted by the home base stations HBS 301 and the home base station controller HBSC 303 looks like a conventional access network portion 10.

The applications that run on the mobile terminal MT 1 on top of the public mobile network radio interfaces also run on top of Bluetooth radio between the mobile terminal 1 and the home base station HBS 301.

The interface between the home base station HBS 301 and the home base station controller HBSC 303 which is designated Y in FIG. 1 is preferably provided by a fixed link. The home base station 301 is intended to be a small device that a subscriber can purchase and install in a desired location such as the home or an office environment to obtain a fixed access to the mobile network. However, they could also be installed by operators in traffic hotspots. In order to reduce the installation costs on the part of the operator, the interface between the home base station 301 and the home base station controller 303, which is designated interface Y in FIG. 1 therefore preferably exploits an already existing connection provided by a fixed network 302. Preferably this network is a broadband packet-switched network. Suitable networks might include those based on ADSL, Ethernet, LMDS, or the like.

Home connections to such networks are increasingly available to subscribers. Although not shown in FIG. 1, the home base station HBS 301 will be connected to a network terminal giving access to the fixed network 302, while the home base station controller HBSC 303 may be connected to an edge router ER of the network 302 that also links the fixed network 302 to other networks such as intranets and the internet. IP is used for communication between the home base station HBS 301 and home base station controller HBSC 303 over the fixed network 302 to render the transport of data independent of the network type. The link between the home base station HBS 301 and the home base station controller HBSC 303 is preferably always open, so that this connection is always available without the need for reserving a channel. While the fixed network 302 is preferably an IP-based network, ATM-based networks could also be used. In particular when DSL technologies are used in this network, they could be used directly on top of the ATM layer, since they are based on ATM. Naturally, an ATM based network could also be used to transport IP, serving as a base layer.

The home base station HBS 301 is installed by plugging it in to a port of a suitable modem, such as an ADSL or CATV modem, to access the fixed network 302. The port is in contact with an intranet that is either bridged or routed on the IP level. Thus standard protocols, such as IP, DHCP, DNS and the like are used. The home base station HBS 301 connected to the modem utilises these standard protocols and functions to establish a connection with a home base station controller HBSC 303. A sign-on procedure for a home base station 301 connecting for the first time or reconnecting to a home base station controller HBSC 303 is for example described in European patent application No. EP-A-1 207 708.

The base stations 101 and 301 in both the conventional access network 10 portion and the unlicensed-radio access network portion 30 define a coverage area depicted in FIG. 1 by hexagonal cells 104, 304. While the relative dimensions of these cells are not accurate in the figure, it is nevertheless clear that the cell coverage of a conventional BTS 101 is far greater than the mini-cell generated by a comparatively low power home base station HBS 301. A mini-cell will have a diameter of around 50 to 200 m. For this reason, and because an HBS 301 can be installed wherever there is a port to the fixed broadband network connected to an HBSC 303, one or more mini-cells 304 generated by HBS's 301 may be located inside the cell 104 of a conventional BTS 101.

In a conventional public licensed mobile network such as GSM, handover of calls between adjacent cells is enabled by informing the currently connected access network 10 and the core network portion 20 of the identification of neighbouring cells by means of a cell global identity CGI, which contains the mobile country code (MCC), mobile network code (MNC), cell identity (CI) and a Location Area code (LAC). Information about which nodes, i.e. the MSCs (or SGSN 203, if available in the network) and BSCs that control these cells is also configured in the mobile core network. The BSC 103 must be able to communicate the absolute radio frequency channel numbers (ARFCN) allocated to all neighbouring cells to a mobile terminal 1 connected to it so that the mobile terminal 1 can measure the associated frequencies and report back the strongest frequencies. In addition to the channel number ARFCN, this message also includes a base station identity code BSIC that is unique in the area to the base station transmitting on the identified channel frequency. With the introduction of a large number of mini-cells 304 resulting from the installation of an unlicensed-radio access network 30 this kind of operation and maintenance activity becomes very complex and cumbersome, particularly as the location of the mini-cells may change over time.

Figure 2:
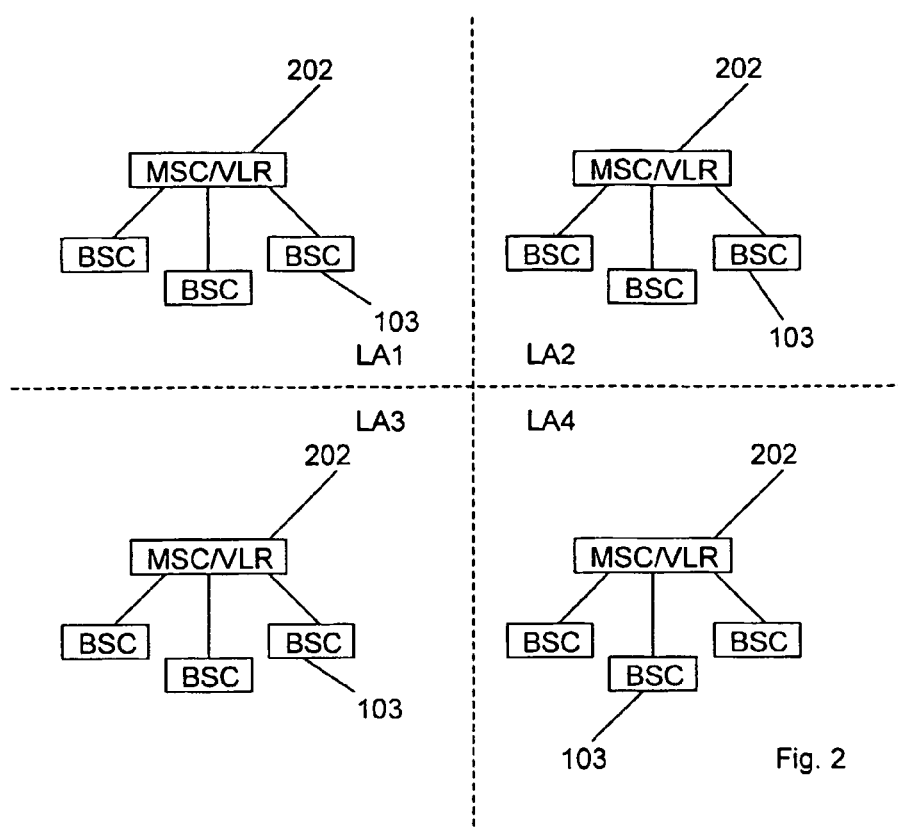

The mobile country code (MCC), mobile network code (MNC) and location area code contained in the cell global identity CGI together define a location area (LA) and are referred to collectively as the location area identifier (LAI). The location area refers to a specific group of base station controllers BSCs and the associated base station tranceivers BTS connected thereto. The GSM network is divided into several location areas LA, which are commonly separated geographically. A simplified logical structure of a GSM network showing the location areas is illustrated in FIG. 2. Four location areas, LA1, LA2, LA3 and LA4 are illustrated in FIG. 2. One mobile services switching center MSC 202 controls a location area LA. A visitor location register VLR 204 is also associated with each location area LA. All base station controllers BSCs 103 connected to this mobile services switching center MSC 202 are assigned to this location area LA. This is also valid for all base station tranceivers BTS 101 associated with each base station controller BSC 103, although these are not illustrated in FIG. 2 for reasons of clarity. While some mobile services switching centers MSC 202 may take care of more than one location area LA, location areas are not split between mobile services switching centers MSC 202. Because the location areas LA generally correspond to separate geographical areas, overlap between cells in different location areas LA is limited and then only for cells between which handover is required. In this case, the cells 104 in an adjacent location area LA must be defined as neighbouring cells in the source mobile services switching center MSC 202 and the base station controllers BSC 103 to enable handover.

When an unlicensed access network is connected to the GSM network a home base station controller HBSC 303 will be connected to a specific mobile services switching center 202 and may thus be considered to form part of the associated location area. However, unlike the fixed location of the base station transceivers BTS 101 of a conventional licensed public mobile network the location of home base stations HBS 301 connected to the home base station controller HBSC 303 can be constantly changing. Also the number of home base stations HBS 301 connected to the home base station controller 303 may also change constantly as new subscribers connect to the unlicensed radio access network. At any one time, therefore, the home base station controller HBSC 303 may be controlling home base stations HBS 301 in very different locations, with neighbouring cells in several different location areas. The problem thus arises how to assign identifiers, such as a cell global identity CGI, to each mini-cell 304 connected to the home base station controller, which mobile station switching center MSC 202 to connect home base station controllers HBSC 303 to, given that these may control mini-cells 304 in very different geographical areas and finally how to the define the location of these mini-cells 304 in neighbouring GSM cells 104 to enable handover given that the mini-cells may be spread across many location areas LA and furthermore may change location.

Multiple home base station controllers HBSC 303 are provided, each of which is allocated to a mobile services switching center MSC 202 controlling a specific location area. Home base stations HBS 301 are then dynamically distributed between the unlicensed radio access networks 30 so that each home base station controller HBSC 303 connected to a mobile services switching center MSC 202 controls only home base stations HBS 301 located in the required location area. This is illustrated schematically in FIG. 3.

Figure 3:
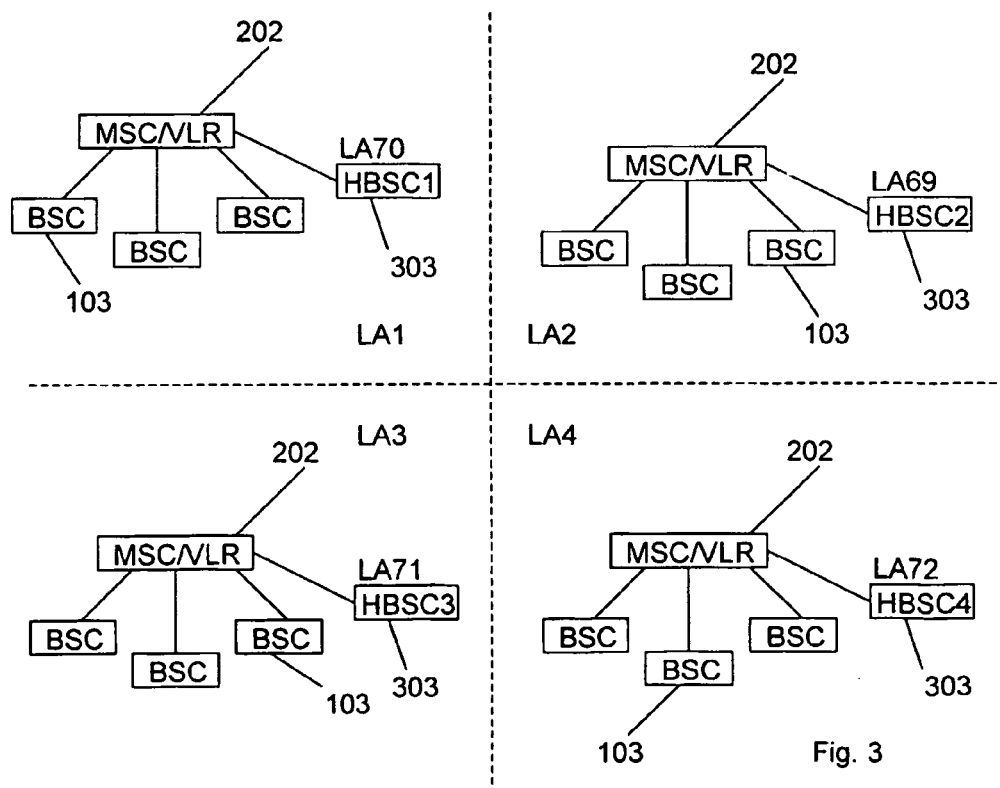

In the arrangement shown in FIG. 3 the division of the GSM network into geographical areas based on the location area concept is retained. Four location areas LA1 to LA4 are illustrated. In each of these areas at least one unlicensed-radio access network is provided by a home base station controller HBSC 303, that will be connected to multiple home base stations HBS (not shown) via a fixed access network 302 (not shown). It is not necessary for each and every location area defined in a public licensed mobile network such as GSM to have an unlicensed access network 30, however, all unlicensed-radio access networks must be fixedly assigned to a location area. Each access network has its own unique cell identifier valid for all mini-cells 304. A location area is part of this unique cell identifier. Accordingly, each home base station controller HBSC1 to HBSC4 303 defines its own unique location area; the home base station controller HBSC1 located in location area LA1 thus defines a further location area LA70, the home base station controller HBSC2 located in location area LA2 defines a further location area LA69, the home base station controller HBSC3 located in location area LA3 defines further location area LA71 and the home base station controller HBSC4 located in location area LA4 defines further location area LA72. Furthermore, all home base stations HBS 301 connected to the home base station controllers HBSC1-HBSC4 have been assigned specifically to this home base station controller as a consequence of their current location. This is achieved using an access point distribution function. In its simplest form the access point distribution function 40 is a lookup table that may be accessed by a home base station HBS 103 or alternatively by home base station controller HBSC 303 to obtain the IP address data of the home base station controller HBSC 303 a home base station should be connected to. If the access point distribution function is to be accessed by the home base stations HBS 301, it should be provided on the fixed broadband network 302 and be accessible by means of a suitable enquiry by the home base station HBS 301 when the latter connects to the broadband network.

Figure 4:
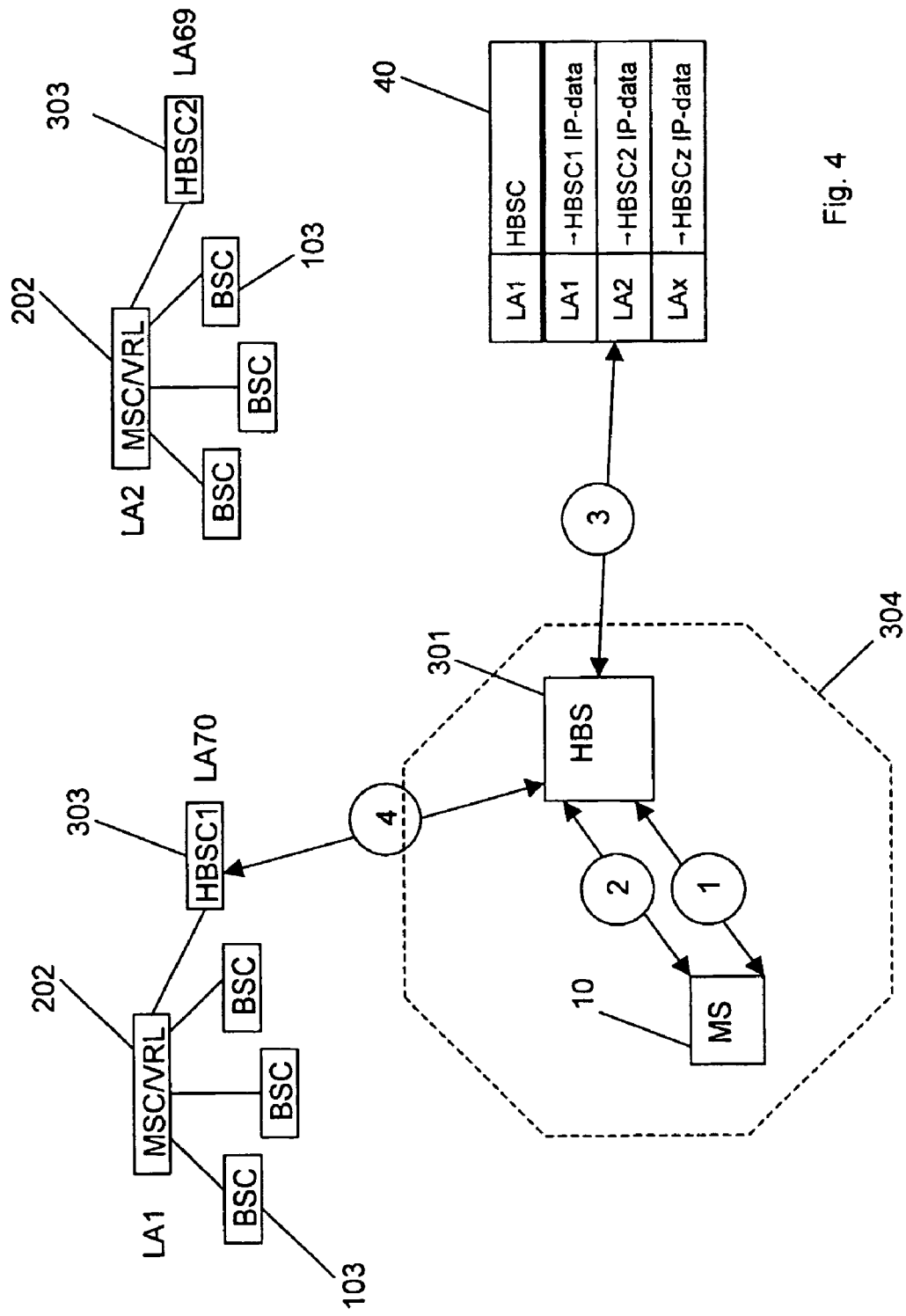

The access network distribution mechanism is illustrated in FIG. 4. FIG. 4 shows two location areas, LA1 and LA2. A first home base station controller HBSC1 3031 is connected in the first of these location areas LA1 and a second home base station controller HBSC2 303 is connected in the second location area LA2. A mobile station MS 10 is shown in the vicinity of a home base station HBS 103 that has not yet connected to a home base station controller HBSC 303. The numbered arrows shown in FIG. 4 illustrate the various messages exchanged between the various elements in order for the home base stations HBS 301 to be assigned to a specific home base station controller HBSC 303, or more generally for unlicensed-radio access points to be distributed to a specific unlicensed radio access network. The signalling sequence suggested by the arrows in FIG. 4 is illustrated in FIG. 5.

Figure 5:
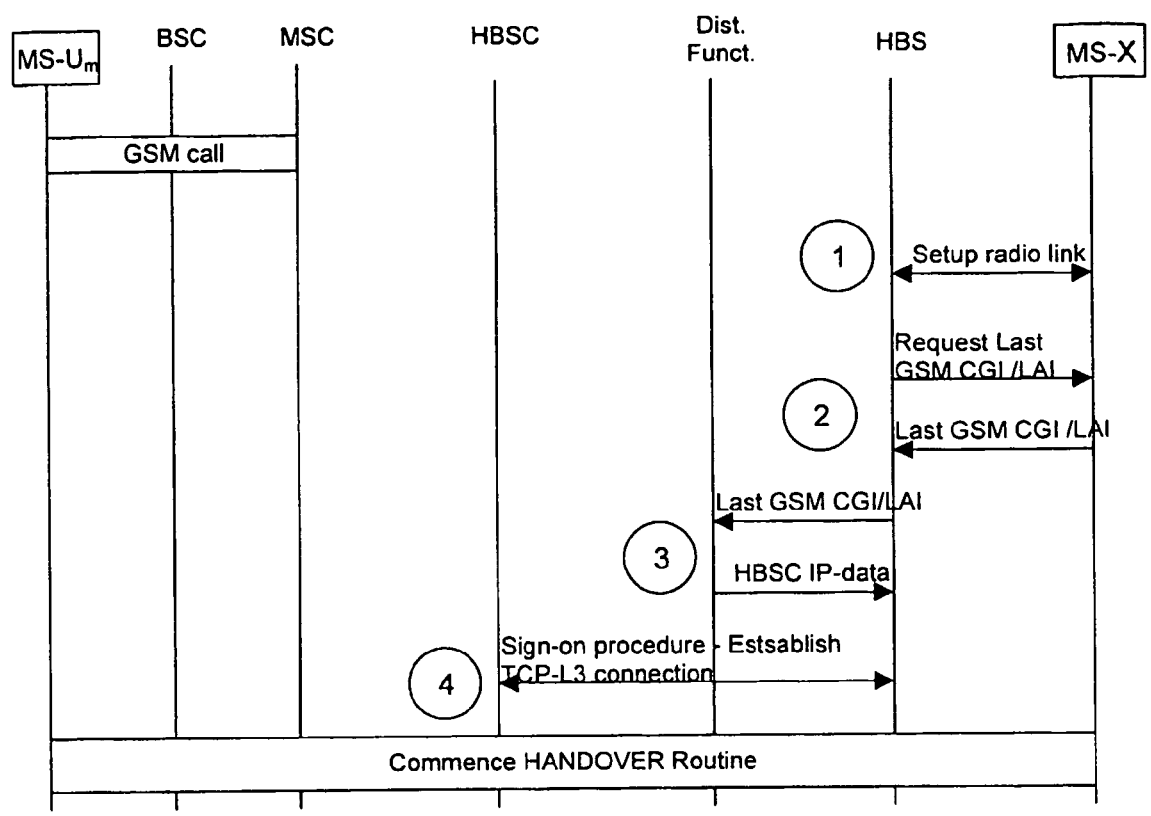

In FIG. 5 the various elements involved in the signalling are shown at the top of the drawing. The mobile station MS is indicated twice on either side of the figure. The left hand mobile station MS Um represents the standard GSM Um interface via which the mobile station communicates with a base station subsystem BSS 10 and the right-hand mobile station MS-X represents the unlicensed radio interface, or X-interface, of the same mobile station, via which the mobile station communicates with a home base station HBS. The access point distribution function Dist. Funct. is illustrated as a separate location. It will be understood, however, that this function may be available at the initial point of contact of the home base station HBS 301 with the fixed broadband access network 302 or alternatively may be provided by a database server located on the fixed broadband access network 302 and accessible by means of a DNS query.

It is assumed that the mobile station is in the location area LA1 and is either roaming in a GSM cell identified by a specific cell identifier CGI or is conducting an active call via the base station controller BSC 103 controlling that cell. The home base station HBS 301 is either newly installed or recently moved from another location and connected to the broadband access network 302. As the mobile station moves into the mini-cell 304 covered by the home base station 301, the home base station establishes a radio link with the mobile station MS 10 via the unlicensed radio interface X as shown at event 1. At event 2, the home base station 301 asks the mobile station MS for the cell identifier CGI or location area identifier LAI of the last GSM cell the mobile station is roaming from or is in contact with. This is supplied by the mobile station MS. At event 3, the home base station HBS 301 connects to the access point distribution function 40 and provides this function with the cell identifier CGI or location area LAI communicated to it by the mobile station MS. In response to this information, the access point distribution function checks the database to determine which home base station controller HBSC 303 is handling the location area defined by the cell identifier CGI or location area identifier LAI. If a home base station controller HBSC 303 is identified for this location area then the corresponding IP-address data required by the home base station HBS 301 to establish a connection with the home base station controller HBSC 303 is transmitted back to the home base station HBS 301. If more than one home base station controller HBSC 303 is present in this location area, information concerning one of these is returned to the home base station HBS 301. With this retrieved address data, the home base station HBS 301 then signs on to the home base station controller HBSC 303 enabling a full connection to be established. The sign-on procedure permits the home base station controller HBSC 303 to update a data structure representing a logical view of all home base stations HBS 301 connected to it. A home base station HBS 301 is allocated an IP address on the fixed network 302. Following sign-on, the handover procedure may begin or alternatively the mobile station may continue to roam through the mini-cell in contact with the home base station controller.

Since the mini-cells 304 generated by each home base station HBS 301 are so small compared to the cells 104 of the GSM or other public licensed-radio mobile network and uplink signal power within a mini-cell low compared with that obtainable in an adjacent or encompassing GSM cell 104, a mobile station MS 10 moving towards a cell 104 of an adjacent location area LA is preferably handed over to a GSM cell 104 of the same location area before switching location areas. Similarly, before entering a mini-cell of a new location area, handover preferably occurs between neighbouring cells of the GSM network so that the mobile station is connected in the correct location area LA before being handed over to a mini-cell 304. With this arrangement, handover from a cell 104 in the public licensed mobile network or GSM network to a mini-cell 304 in the unlicensed-radio access network 30 requires only that the HBSC cell identifier CGI be defined in the other elements of the same location area. In other words this CGI must be defined in the mobile services switching center MSC 202 to which the home base station controller 303 is connected as well as the base station controllers BSC 103 and base station transceivers BTS 101 likewise connected to this mobile services switching center MSC 202. Similarly, for handover from an unlicensed-radio access network 20, i.e. from a home base station controller HBSC 303 to a GSM cell, only those cell identifiers handled by base station controllers BSC 103 connected to the same mobile services switching center MSC 202 as the home base station controller HBSC 303 need be defined as neighbouring cells in the unlicensed radio access network 30 of this home base station controller HBSC 303 as well as in the mobile services switching center MSC 202. Alternatively, no information about neighbouring cells need be configured in the unlicensed-radio access network. Instead, a mobile station MS will report the cell identifier of a neighbouring cell identifier CGI dynamically to the HBSC, that then triggers the Handover towards this Cell.

This greatly reduces the installation activities required to enable handover when a public licensed mobile network is extended using unlicensed-radio access networks 30.

Figure 7:
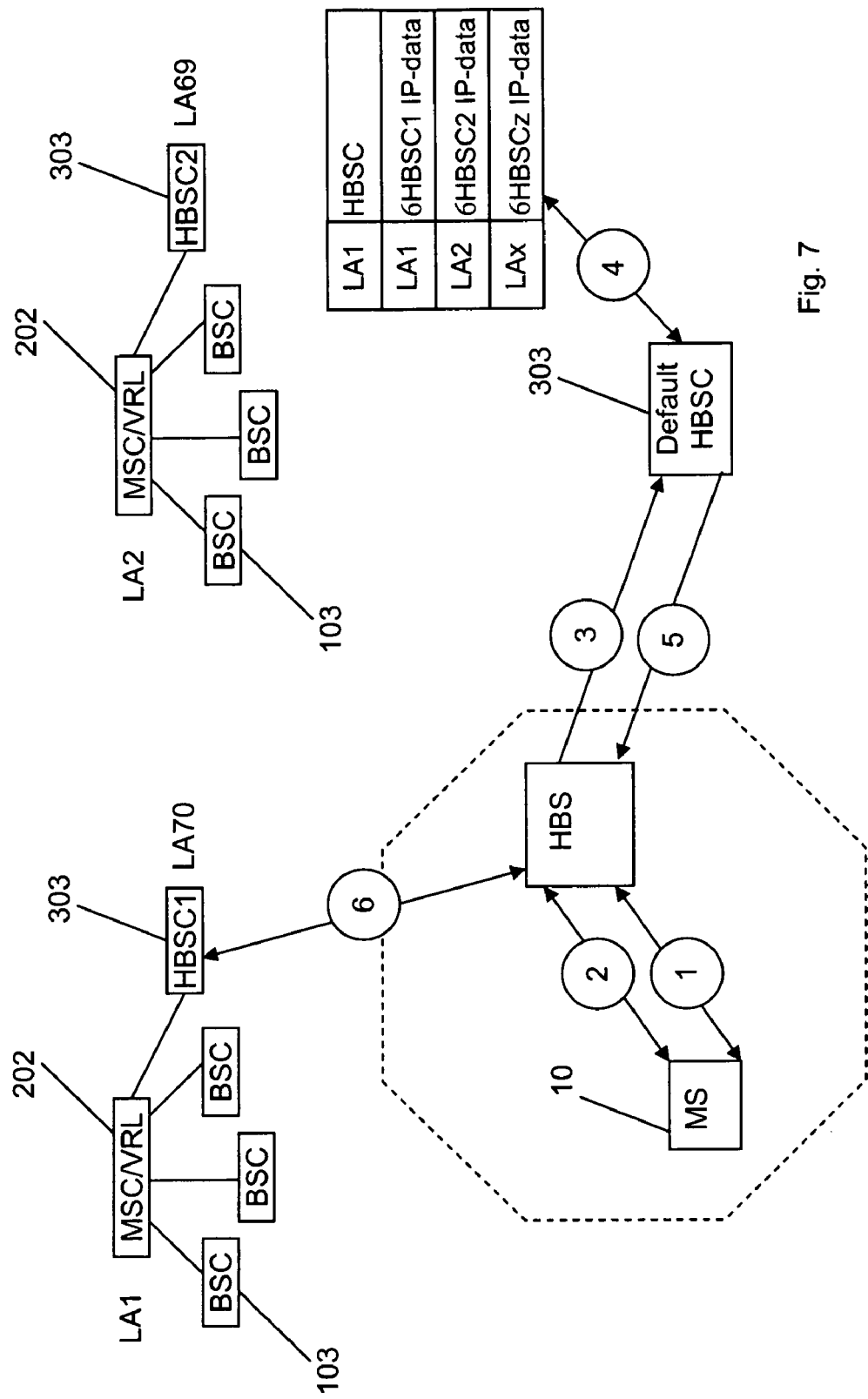
Figure 8:
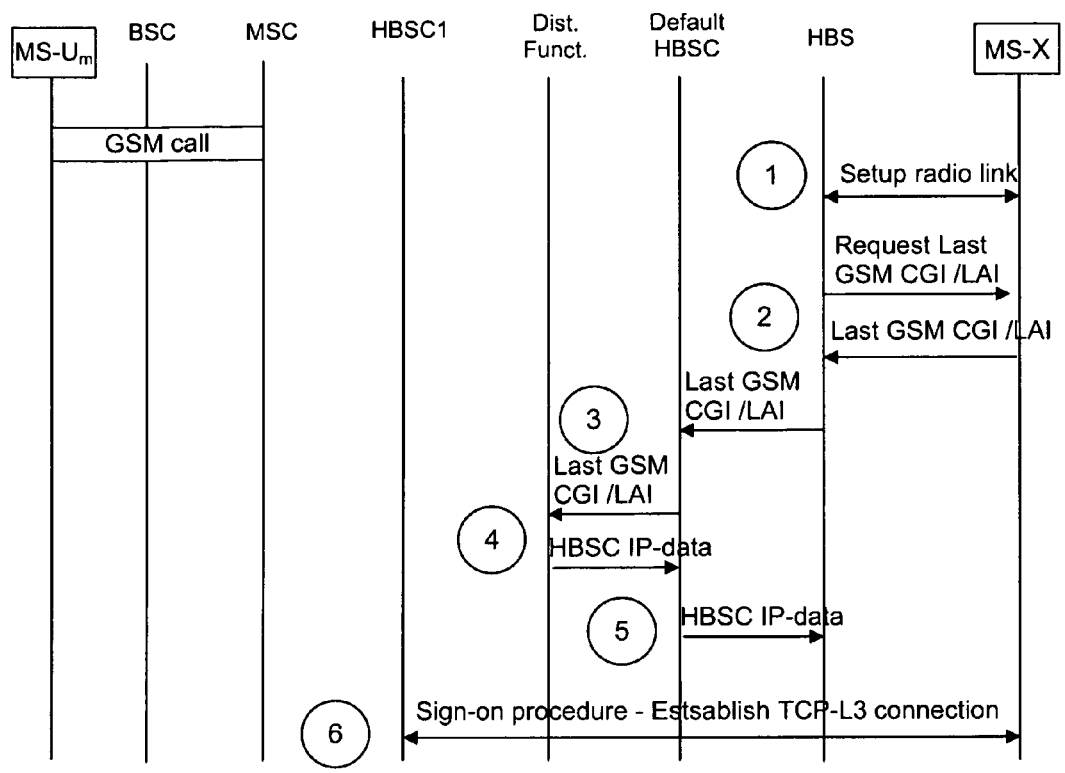
FIG. 8 illustrates the signalling sequence between the elements depicted in FIG. 7

In accordance with an alternative arrangement each home base station HBS 301 is allocated to a default home base station controller HBSC 303. In this way, when a home base station is moved and reinstalled or rebooted, the initial connection made with the access network is with this default home base station controller HBSC 303, and the home base station HBS is subsequently redirected to a new home base station controller HBSC 303 when it roams into a mini-cell in the associated location area. This is illustrated in FIG. 7. FIG. 7 contains all elements of FIG. 4 and retains the same reference numerals for like parts. In addition, FIG. 7 shows a default home base station controller HBSC 303. The default home base station controller 303 then invokes the access point distribution function 40 in response to a request and returns the IP address of a home base station controller active in the identified location, if such is stored in the distribution function 40. The signalling sequence is illustrated in FIG. 8. The signalling illustrated in FIG. 8 at events 1 and 2 are identical to events 1 and 2 of FIG. 5. At event 3, the home base station HBS 301 connects to the default home base station controller HBSC and supplies the default home bast station controller 303 with the cell identifier CGI or location area identifier LAI of the last contacted GSM cell. At event 4 the home base station controller 303 then invokes the access point distribution function by querying the database server and returns the address of the "closest" home base station controller HBSC 303 to the home base station 103 and ultimately to the mobile station MS at events 4 and 5. The retrieved address data is then used for conducting a sign-on procedure at event 6 in the same way as described for event 4 in FIG. 5.

To prevent congestion the access point distribution function 40 is available on several database servers spread over the whole network and specific to each operator. The mobile country code MCC and mobile network code MNC contained in the cell global identity CGI can then be used to construct a DNS-query that is directed to an operator specific database server. Once the address of the database server has been retrieved, this should be saved in the home base station HBS 301. Locating of the database server would then not be necessary unless triggered by the operating and maintenance system of the network or by the end user, for example when the home base station HBS is reset to the factory default settings.

Preferably the location area identity LAI portion of the cell global identity CGI and the home base station controller information retrieved with this indicator should also be saved in the home base station to decrease the load towards the database server. In this way if there is a power cut or the home base station HBS needs to be rebooted, this information can be retrieved without having to launch a further query. A cache memory would also enable a limited storage of mapping for the last few location areas. This would be useful when a home base station HBS is used away from home frequently but always returns to the same location area afterwards.

If a home base station HBS 301 is used in an area where there is no public licensed mobile network coverage, the mobile station MS 10 should indicate this fact to the home base station HBS 301 and at the same time send the last received cell global identity CGI or location area identifier LAI instead. The home base station HBS could then use the mobile country code MCC and mobile network code MNC portions of the cell global identity to locate a database server and access the access point distribution function. In this case the query to the database server would have to contain some kind of home base station identification together with the cell global identity CGI of the last known mobile network cell. Based on this modified request, the database server would have to return a home base station controller information according to a modified mapping. For example, this could be a static allocation based on the home base station identifier. Alternatively a default home base station controller HBSC 303 may be allocated to all home base stations HBS in an area where there is no public licensed mobile network coverage.

Figure 6:
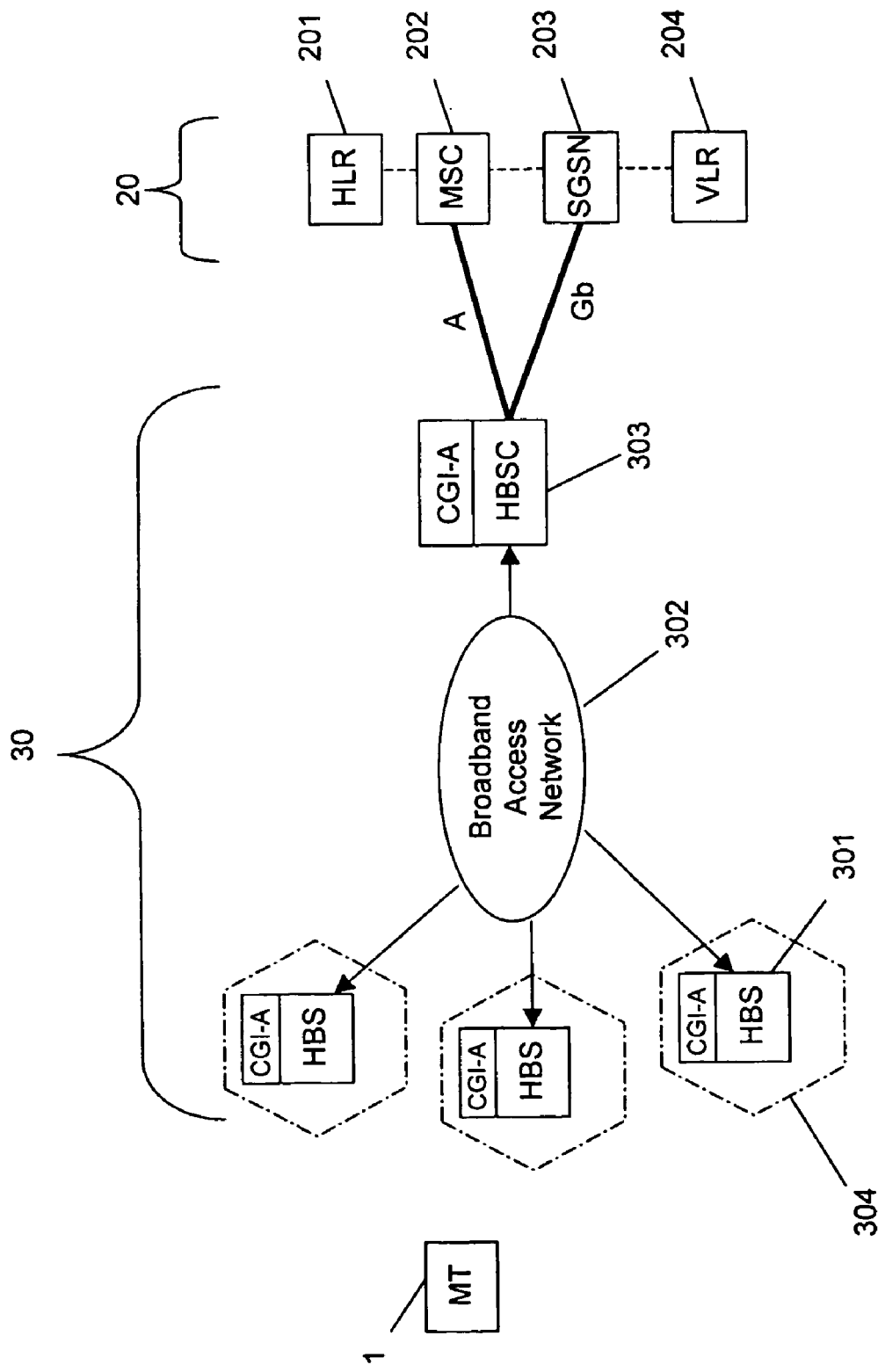

The installation overheads required for handover can be still further reduced when the whole of an unlicensed-radio access network is defined by a single cell global identifier CGI. This is illustrated in, FIG. 6. This figure schematically depicts an unlicensed-radio access network as shown in FIG. 1 with the core network portion 20 likewise illustrated in FIG. 1. Like reference numerals have been used for like parts in both figures, so a renewed description of these will not be repeated. In the unlicensed-radio access network 30, the home base station controller HBSC 303 controls several home base stations HBS 301. This is exemplified in FIG. 6 by the depiction of three HBS 301.

For the purposes of identifying the mini-cells 304 to enable handover, rather than allocating a unique cell identifier, base station identifier and frequency channel number to each mini-cell 304, all mini-cells 304 in the same unlicensed-radio access network are identified to the GSM network by the same identification. In effect, the whole unlicensed-radio access network 30 or rather the home base station controller HBSC 203 controlling this access network is assigned a single cell identification. This identification is then distributed in the network by manual operation and maintenance procedures on installation so that the core network portion and the relevant base station subsystems BSS 10 controlling cells neighbouring one or more mini-cells can access this identification. The cell identification is equivalent to the cell global identity CGI used in a conventional GSM network and also includes a unique, single Location Area assigned to the whole access network 30. This is illustrated schematically in FIG. 6 by the assignment to the home base station controller 303 of a cell identifier CGI-A.

In addition to the cell identifier CGI, the unlicensed-radio access network has a single base station identifier BSIC and absolute radio frequency channel number ARFCN. The base station identifier BSIC and absolute radio frequency channel number ARFCN are communicated by each home base station HBS 301 in response to a measurement report request from the mobile station MS 1, and consequently an indication of these identifiers will be included in any measurement report sent by a mobile station 1 to its connected base station controller 103 when it established a connection with a home base station HBS 301 of an unlicensed-radio access network 30. This naturally implies that the absolute radio frequency channel number ARFCN of the unlicensed-radio access network is included in the measurement list sent by the base station subsystem BSS 10 connected to the mobile station 1. The combination of the base station identifier BSIC and absolute radio frequency channel number ARFCN should thus serve to indicate the specific cell identifier CGI allocated to the unlicensed-radio access network 30. If more than one unlicensed-radio access networks are present, each will have a single associated cell identifier CGI and thus a single combination of base station identifier BSIC and absolute radio frequency channel number ARFCN.

On installation of the unlicensed-radio access network, the single cell identifier CGI is communicated to all base station subsystems BSS 10. These elements will also be informed of the associated base station identification code BSIC and absolute radio frequency channel number ARFCN. This permits base station subsystem BSS 10 to include the frequency emitted by the neighbouring home base station in the list of frequencies communicated to a mobile station within its own cell 104 that are to be measured and reported back on to determine whether handover is required and to which cell. The mobile services switching centers MSC 202 and/or GPRS support nodes SGSN 203 will likewise be informed of the single cell identifier.

The unlicensed-radio access network 30 described with reference to the figures resembles a conventional access network in that there are a plurality of base station elements with their own functionality and a controller connected to these base stations. However, the present invention is not limited to this structure. In an alternative embodiment the same operation is achieved with an essentially transparent access point, that is an existing access point to a broadband network, by transferring the functionality of the home base stations to the home base station controller, the mobile station or both. In other words, the mobile station communicates directly with the home base station controller HBSC 303 over an unlicensed-radio interface and the broadband network via the access point. As far as signalling is concerned, this would mean that messages between the mobile station MS and the home base station HBS and also those between the home base station HBS and the home base station controller HBSC would be transported directly between the mobile station and home base station controller. The home base station HBS thus serves simply as a transparent access point. The mobile station will request and be allocated the home base station controller address information. Similarly, the mobile station MS should have some form of cache mechanism enabling the storage of a limited number of mappings between cell global identities CGI and address information of the associated home base station controllers HBSC retrieved earlier.

The above detailed description of cell management has referred to GSM networks as a conventional public mobile network. It will be understood by those skilled in the art, however, that the above description applies equally to other public mobile networks, such as UMTS or CDMA2000.

The invention claimed is:

1. A mobile telecommunications network including:
   a plurality of base station systems arranged to communicate with a mobile terminal over a predetermined licensed radio interface and switching centers connected to a plurality of said base station systems wherein each switching center and the base station systems connected thereto share a location area identity, said base station systems being adapted to communicate information indicative of said location area identity to a mobile terminal,
   wherein said network further includes at least two unlicensed-radio access networks, each comprising an access network controller connected to one of said switching centers, multiple access points adapted to communicate with said mobile terminal via an unlicensed-radio interface and a broadband network connecting said plurality of access points with said access network controllers and a lookup table mapping a location area identity with address information for an access network controller on said broadband network, and wherein each said access point is arranged to connect a mobile terminal with a default access network controller, said default access network controller being adapted to receive a request from said mobile terminal containing information indicative of a last location area received by said mobile terminal, to submit a request to said lookup table containing said location area information, to receive address information from said lookup table for an access network controller mapped to said location area in response to said request, and to transmit said address information to said mobile terminal via said access point, said address information enabling said mobile terminal to establish a connection with said addressed access network controller via said access point and said broadband network.

2. A network as claimed in claim 1, wherein said mobile terminal is adapted to store at least part of said lookup table.

3. A network as claimed in claim 1, wherein said default access network controller is adapted to store at least part of said lookup table.

4. A network as claimed in claim 1, wherein said broadband network is an internet protocol based network and said address is an internet protocol address.

5. An unlicensed-radio access system connected to a core network portion of a licensed mobile network, said unlicensed-radio access system including:

a plurality of access points adapted to communicate with mobile stations over an unlicensed-radio interface, a plurality of access network controllers connected to said core network portion and a broadband network connected to both said access points and said access network controllers, wherein each said access network controller is associated with a location area in said licensed radio mobile network, said system furthermore being provided with at least one lookup table containing information mapping location areas to address information of access network controllers on said broadband network, wherein each access point is arranged to receive from a mobile station information indicative of a location area corresponding to a portion of said licensed mobile network, to obtain from said lookup table address information of an access network controller on said broadband network associated with said location area information, and to establish a connection with said addressed access network controller via said broadband network.

6. A system as claimed in claim 5, wherein said lookup table is comprised in a database server located on said broadband network.

7. A system as claimed in claim 5, wherein said access points are arranged to store at least part of the data in said lookup table.

8. A system as claimed in claim 5 or 6, wherein said fixed broadband network is an internet protocol based network and said address is an internet protocol address.

9. A system as claimed in claim 5, wherein each access point is connected for communication with a default access network controller, wherein the access points are arranged to connect to a different access network controller if the information indicative of a location area does not correspond to the broadband network address of said default access network controller.

10. A method for establishing a connection between a mobile terminal and a core network portion of a mobile communications network via an unlicensed-radio access network, said mobile communications network comprising:

access portions including base stations and switching control parts connected to said base stations, each switching control part sharing a common location area identity with a plurality of said base stations and said base stations being arranged to communicate said location area identity to a mobile terminal, said unlicensed-radio access network comprising at least one access point arranged to communicate with a mobile station via an unlicensed-radio interface, at least one access network controller each connected to a switching control part, a broadband network connected to said at least one access network controller and access point and a lookup table containing data mapping a location area identity with an address of one of said access network controllers on said broadband network, said method including the steps of:

a default access network controller receiving information indicative of a location area identity from a mobile terminal via an access point;

said default access network controller submitting a request to said lookup table using said location area identity information;

receiving from said lookup table an address on said broadband access network of an access network controller associated with said location area identity; and relaying said address to said mobile terminal via said access point to enable said mobile terminal to establish a connection with said addressed access network controller via said access point and broadband network.

11. A method in an unlicensed radio access network for assigning and connecting access points to an access network controller, said unlicensed radio access network including a plurality of access points a plurality of access controllers connected to a licensed mobile core network and a broadband network connected to said access controllers and for connecting to said access points, and wherein each access network controller is associated with a location area of said licensed mobile network, said method including the steps of:

receiving from said mobile station a location area indicator indicative of a location area of said licensed mobile network with which said mobile station was last in communication, retrieving broadband network address information for an access point switching controller associated with said location area indicator, and connecting said access point to said retrieved broadband network address of said an access point switching controller to establish a connection.

12. An unlicensed-radio access network controller connected to a core network portion of a licensed mobile network and to a plurality of access points via broadband network, wherein said access network controller is arranged to communicate with a lookup table containing information mapping location areas to address information for addressing access network controllers on said broadband network, said access network controller being further arranged:

to serve a mobile terminal as a default access network controller, and to receive from said mobile terminal information indicative of a location area corresponding to a portion of said licensed mobile network, to obtain from said lookup table address information of an access network controller on said broadband network associated with said location area information, and to transmit said address information to said mobile station.

* * * * *

UNITED STATES PATENT AND TRADEMARK OFFICE
CERTIFICATE OF CORRECTION

PATENT NO. : 8,014,776 B2  
APPLICATION NO. : 10/589873  
DATED : September 6, 2011  
INVENTOR(S) : Nylander et al.

Page 1 of 1

It is certified that error appears in the above-identified patent and that said Letters Patent is hereby corrected as shown below:

IN THE SPECIFICATIONS:

In Column 10, Line 37, delete "bast" and insert -- base --, therefor.

IN THE CLAIMS:

In Column 13, Line 61, in Claim 8, delete "claim 5 or 6," and insert -- claims 5 or 6, --, therefor.

Signed and Sealed this  
Twenty-seventh Day of March, 2012

David J. Kappos  
*Director of the United States Patent and Trademark Office*